Figure 1:
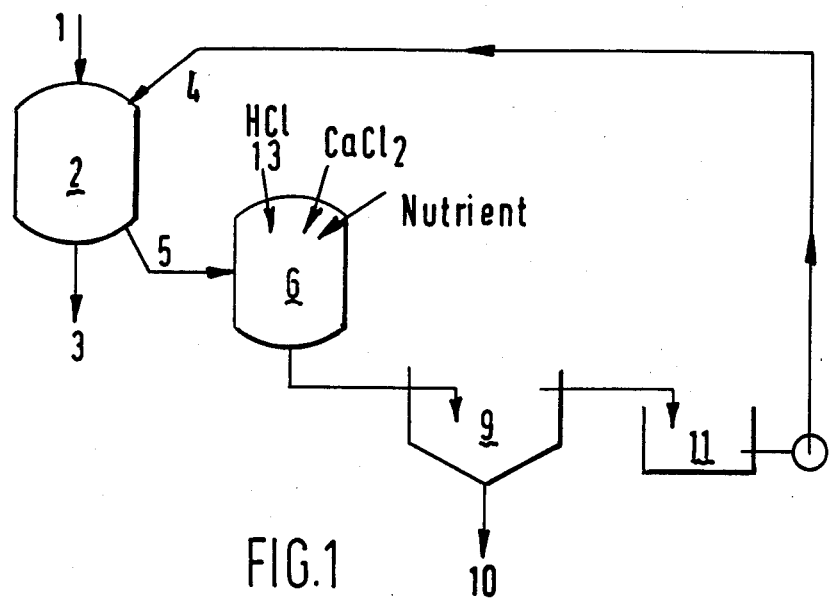

United States Patent [19]

Solt et al.

[11] Patent Number: 4,671,879

[45] Date of Patent: Jun. 9, 1987

[54] PROCESS FOR REDUCING THE NITRATE CONTENT IN WATER

[76] Inventors: George S. Solt, Hollington Wood, Emberton, Olney, Buckinghamshire, MK46 5JH, England; Abraham Klapwijk, Langhoven 44, 6721 SK Bennekom, Netherlands

[21] Appl. No.: 753,031

[22] Filed: Jul. 8, 1985

[30] Foreign Application Priority Data

Jul. 10, 1984 [GB] United Kingdom ............... 8417530

[51] Int. Cl.$^4$ .............................................. B01J 1/09
[52] U.S. Cl. .................................. 210/610; 210/631; 210/677; 210/683; 210/903
[58] Field of Search ............... 210/610, 677, 683, 903, 210/611, 631, 656, 663, 668

[56] References Cited

U.S. PATENT DOCUMENTS

| 4,043,936 | 8/1977 | Francis et al. | 210/610 X |
| 4,098,690 | 7/1978 | Semmens | 210/903 X |
| 4,370,234 | 1/1983 | Marsland | 210/903 X |
| 4,479,877 | 10/1984 | Guter | 210/903 X |
| 4,522,727 | 6/1985 | Weber | 210/903 X |

Primary Examiner—Tom Wyse
Attorney, Agent, or Firm—Silverman, Cass, Singer & Winburn, Ltd.

[57] ABSTRACT

The present invention provides a process for reducing the nitrate content in water, wherein water containing nitrate is contacted with an anion exchanger containing chloride and/or bicarbonate ions to remove the nitrate, whereafter the exhausted anion exchanger is regenerated, the spent eluate either (a) being divided into two or more portions at least one of which is rich in sulphate and at least one of which is rich in nitrate, the sulphate-rich portion being dumped to drain or being passed to a reaction vessel or vessels in which sulphate ions present therein are precipitated out as calcium salt by the addition of a water-soluble calcium salt or by adding an aqueous slurry of calcium hydroxide and in which denitrification is carried out on the nitrate-rich portion by means of appropriate anaerobic bacteria, a carbon source for the bacteria also being introduced into the reaction vessel and pH correction being carried out, if necessary, or (b) in which reductions of the sulphate and nitrate ion concentrations are carried out on the recovered eluate without dilution into one or more portions, the content of chloride and/or bicarbonate being supplemented by the addition of appropriate sources of chloride and/or bicarbonate, whereafter some or all the solution is recycled to the anion exchanger for use as eluent in a subsequent ion exchange cycle.

19 Claims, 7 Drawing Figures

PROCESS FOR REDUCING THE NITRATE CONTENT IN WATER

DESCRIPTION

The present invention is concerned with an improved process for reducing the nitrate content of water.

Two main methods of removing nitrates are well known. The first is by anion exchange, using an anion exchange resin in a chloride or bicarbonate cycle. In the chloride cycle, the resin used is regenerated with sodium chloride and in the bicarbonate cycle with bicarbonate. The exchanger then removes all the sulphate together with the nitrate, replacing these ions with chloride or bicarbonate ions, respectively for the cycle concerned. In the floride cycle, a part of the bicarbonate content of the water is also replaced by chloride The product water from the chloride cycle is, therefore, liable to be corrosive and of reduced palatability. Alternatively, the bicarbonate cycle avoids the removal of bicarbonate ions but involves a more expensive and difficult regeneration.

An important objection to the ion exchange process is, however, the difficulty of disposing of the spent regenerant, which is rich in excess regenerant and contains the nitrates removed from the water, without damage to the environment.

The other well known nitrate removal process is the destruction of nitrate with denitrifying bacteria in an anoxic process. This process requires the addition of a nutrient carbon source and an electron donor, such as methanol. Before denitrification can begin, oxygen dissolved in the water must first be consumed, with a corresponding consumption of nutrient. Water produced by the anoxic process has to be reconditioned and the biomass has to be removed from it.

However, this process is difficult to control and the cost and toxicity of the methanol used as the nutrient carbon source and electron donor are also disadvantageous factors. The dentrification process is liable to produce concentrations of nitrite, which is carcinogenic, or other undesirable side products in the water.

The present invention provides a way of combining elements from these two known method in order to avoid the main objections to both of them.

According to the invention there is provided a process for reducing the nitrate content in water wherein water containing nitrate is fed through anion exchanging means, including the steps of regenerating the anion exchanging means with an eluent to produce a nitrate containing eluate, biologically treating the eluate to reduce the nitrate content thereof, and utilising the eluate of reduced nitrate content in a recycled eluent for regenerating the anion exchanging means.

For continued re-use of eluate, which is the basis of the present invention, it is desirable to prevent accumulation of sulphate ions which are eluted from the ion exchange means, though a certain level of sulphate in the recovered eluate can be tolerated.

For example, the entire recovered eluate can be bulked and dosed with calcium ions in order to precipitate sulphate, which is allowed to settle out before recycling the liquor.

In anion exchange, the affinity of the exchanger for sulphate is higher than that for nitrate so that chromatographic banding takes place. This banding may be utilised to obtain separate sulphate-rich and nitrate rich fractions of spent eluate. For example, the ion exchange stage may be carried out by two or more ion exchange columns in series, after which the first column will be found to contain primarily sulphate and may be regenerated separately to yield a sulphate-rich eluate. Alternatively, each ion exchange column may be equipped with an additional liquid distribution device present at an appropriate level within the column, which may be used to regenerate the exchanger lying above the device separately from that lying below it.

The sulphate-rich portion of the eluate may be sent to drain in situations where it is easy to dispose of such a liquor.

Alternatively, the sulphate in such a portion of the eluate may be precipitated by the addition of calcium in some appropriate form and the resulting slurry containing calcium sulphate, together with surplus regenerant, can be allowed to settle and the supernatant liquor sent to drain. Alternatively, calcium sulphate is precipitated in the same way but the supernatant liquor is recycled to the process.

In cases where the sulphate content of the raw water is low, it may be possible to operate the cycle without precipitation of sulphate from the spent regenerant, possibly with occasional purging of portions of recovered liquor to keep the recirculating sulphate within manageable limits.

Calcium may be added in the form of dry or slurried lime or as calcium oxide or calcium chloride. The latter serves the dual purpose of removing surplus sulphate and, at the same time, of adding chloride ions to make up for the loss of anions from the cycling regenerant. it is also possible to use calcium bicarbonate solutions to achieve this object.

The precipitation of calcium sulphate is known to be troublesome. In order to achieve a precipitate which settles readily, it may prove convenient to add a surface agent to promote coagulation of the particles or to add seeding material. Another means of promoting a better precipitate is to raise the pH of the solution, for example by dosing with lime, and to cause calcium carbonate to co-precipitate with calcium sulphate.

The recovered eluate or the nitrate-rich portion only is subjected to biological denitrification to remove nitrate. In the course of this operation, bicarbonate may be created in the solution.

The solution may then be brought up to the appropriate concentration by adding chloride and/or bicarbonate and re-used in a subsequent ion exchange cycle. Therefore, the present invention includes nitrate removal by ion exchange, using either chloride or bicarbonate as the regenerating ion, or by regenerating with a chloride/bicarbonate mix. In all these case, a modest quantity of residual sulphate and/or nitrate may be permitted to accompany the recycled regenerant.

Alternatively, it is possible that anions such as sulphates can be used instead of chloride or bicarbonate as the regeneration ion.

The biological denitrification reaction can be carried out in a moving or fixed bed microbiological reactor, a fixed bed reactor being operated in upflow or downflow. This biological denitrification reaction is most conveniently carried out in an upflow device containing a fluidised bed of biomass. This bed may or may not be seeded with sand, the object of such seeding being to provide a surface on which the biomass may settle and so create heavier particles which permit a higher upflow velocity, while at the same time reducing the carry-over of suspended matter. Another possibility is the use of immobilized denitrifying microorganisms in a polymer gel. The denitrifying bacteria require a carbon source and an electron donor, such as for example methanol, or hydrogen together with an inorganic source of carbon, such as carbonate and/or bicarbonate. It may also be necessary to provide the bacteria with certain additional nutrients such as trace elements.

Since the denitrification reaction does not take place in the product water, it is not necessary that all the carbon source be consumed by the bacteria. Other materials less easily taken up by the bacteria may be considered as a means of reducing the cost of the operation or an excess of nutrient used to promote the denutrification.

One of the advantages of the process of the present invention is that the nutrient added to promote the bacterial action is not added into the product water itself. This allows methanol to be used without major precautions but other nutrients can also be considered, such as sewage sludge or other waste products.

It is to be understood, however, that any source of carbon which might have a disadvantageous effect on the ion exchanger must be removed before the solution is contacted with the ion exchanger.

The denitrified solution coming from the biological reactor is likely to contain suspended biomass and some live bacteria. It may therefore be necessary to clarify this solution by some conventional means such as a sand filter, microstrainer, or other liquid/solids separation process. It may also be desirable to disinfect the solution at this point to minimise transport of live bacteria, which might cause difficulties by settling and breeding in the ion exchanger. Such disinfection may be carried out by conventional means such as dosing of biocides or irradiation with ultra-violet light. The process may therefore include either a clarification step between the biological reactor and the ion exchanger, or some means of disinfecting the solution between these two points, or clarification followed by means of disinfection.

Some living organisms may nevertheless survive to to breed in the ion exchanger to an extent which is harmful to its operation. The invention therefore preferably includes periodic disinfection of the ion exchanger, by some conventional means, such as for example by contacting it with a biocidal solution.

After appropriate chemical dosing, the denitrification liquor coming from the biological reactor is available for re-use as ion exchange regenerant. This dosing may include topping-up the regenerating ions with appropriate chemicals, such as sodium bicarbonate or sodium chloride. It may also be necessary to adjust the pH because the effect of biological denitrification is to increase the alkalinity of the solution. pH adjustment may be achieved by dosing with hydrochloric acid and thus increasing the chloride concentration and/or by introducing carbon dioxide, which will increase the bicarbonate concentration.

If lime or quicklime is used to promote the precipitation of calcium sulphate in the recovery cycle, similar methods may be used to restore a neutral pH.

When carbon dioxide is used for pH correction, this can be achieved by contacting the solution with a combustion gas, in which case the solution will also be heated. A rise in the temperature of up to, for example 30° C. will assist the denitrification process and also reduce the solubility of the calcium sulphate and accelerate the precipitation thereof.

The use of lime as a calcium source will bring about a rise in pH, which will also promote the precipitation of calcium sulphate. If the pH rise is sufficiently high, there will also be some precipitation fo calcium carbonate which may provide nucleation for the formation of calcium sulphate crystals.

The use of lime and carbon dioxide thus allows considerable scope for controlling the calcium concentration and the pH and the efficient precipitation of calcium sulphate can thereby be promoted and the bicarbonate concentration of the recycled regenerant can be increased.

In order to achieve this control, it is preferable to separate the sulphate precipitation stage from the denitrification stage and perform them in two separate vessels.

Ion exchange may be carried out in several batch columns piped in parallel and the flow rates and cycle times so arranged that the flow through the bio-reactor can be piped directly to regenerate one of the ion exchange columns while, at the same time, the flow of spent regenerant passes directly to the bio-reactor. In this way, the need for intermediate storage vessels is avoided. It may also prove convenient to allow the liquid flow through the bio-reactor to be recycled so that only an appropriate portion of this flow is taken away for re-use.

Therefore, the main features of the process of the present invention are:
(a) an anion exchange step for reducing the nitrate content of water, in which the spent ion exchange eluate is procesed for recovery and re-use;
(b) an optional step in which the sulphate content of the spent eluate is largely removed by precipitation as calcium sulphate;
(c) a step in which the nitrate content of the spent eluate is largely removed by biological means;
(d) an optional step in which the spent eluate recovery includes a pH correction by means of carbon dioxide and/or hydrochloric acid in order to increase the bicarbonate and/or chloride content of the recovered eluate;
(e) an optional step in which the carbon dioxide is provided in the form of combustion products in such a way that the recycling solution is simultaneously heated.

The process of the present invention will now be described in more details, with reference to the accompanying drawings which schematically illustrate examples of flow diagrams for carrying out the process.

FIG. 1 of the accompanying drawings shows a flow sheet for the process of the present invention in its simplest form. Raw water flows through 1 into an anion exchanger unit 2 and treated water is removed at 3. When the anion exchange resin in unit 2 is exhausted, it is regenerated with eluent supplied from a regenerant recycling loop 4, the spent eluate leaving the ion exchange resin 5. The eluent typically comprises a strong aqueous solution of chloride and bicarbonate ions for regenerating the ion exchange resin as previously discussed.

Any of the various known kinds of ion exchange plant may be used for this purpose: fixed bed plants regenerated in co-flow or counterflow or continuous or semi-continuous ion exchange units. The rinse, regeneration and backwash stages will be appropriate for the type of unit preferred. Whichever type is used, care should be taken to recover the spent eluate with a minimum of chemical loss and a minimum of dilution.

The spent eluate leaving the unit 2 at 5 enters a reaction vessel 6 which contains a colony of denitrifying bacteria. Calcium ions and nutrient are added to this vessel so that, on the one hand, excess sulphate in the solution is precipitated as calcium sulphate and, on the other hand, the nitrate content is reduced by biological action. In the basic flow sheet of FIG. 1, the calcium source is shown as being calcium chloride which thus simultaneously provides a source of chloride ions to restore those chloride ions used in the ion exchange regeneration. A carbon and electron donor source, such as methanol. is added, together with whatever trace elements are required to sustain the bacteriological activity.

The reduction of the nitrate content results in the creation of a proportionate quantity of bicarbonate and a small amount of free hydroxyl ions which leads to a rise in pH. which may have to be controlled by appropriate acidification. Convenient methods of performing this are to dose in hydrochloric acid to increase the chloride concentration and/or to introduce carbon dioxide to increase the bicarbonate concentration. FIG. 1 shows the dosing in of hydrochloric acid at 13.

The products of the reaction in vessel 6 include precipitated calcium sulphate and excess biomass. The solution carrying these then passes on to a clarifier 9 in which the solids are removed as sludge at point 10. The clarified liquid passes on to a storage tank 11, in which its strength is made up by the addition of sodium chloride, after which it is available for re-use as eluent 4 in a subsequent cycle. The tank 11 may be equipped with a source of ultraviolet light to disinfect the stored solution.

The clarifier 9 is intended to represent any appropriate solid-liquid separation system and may incorporate such processes as filtration and/or sedimentation and-/or flotation.

Figure 2:
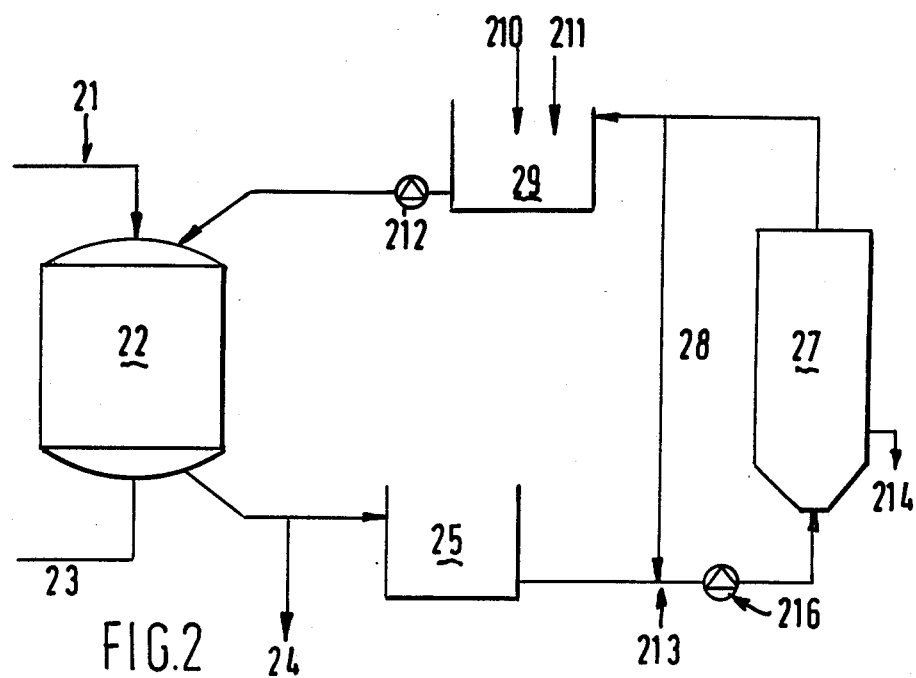

According to FIG. 2, the water to be treated 21 enters the ion exchange vessel 22 and leaves with the nitrate removed by pipe 23. When the ion exchanger is exhausted, it is regenerated with a solution from stock tank 29 and the spent eluate is divided into two parts: a sulphate-rich fraction containing little or no nitrate is discharged to drain by pipe 24, while the remainder, which contains the nitrate removed from exchanger 22 passes to a holding tank 25. From this, the solution is pumped into a biological reactor 27 by pump 26, which also draws from the recirculating loop 28. Methanol or an equivalent carbon source and trace nutrients are added into this loop at 213. The dentrified liquid is taken off to the stock tank 29 into which is added strong brine or sodium bicarbonate or a mixture of the two at 210, in order to make up losses of regenerant chemicals, and hydrochloric acid or carbon dioxide through pipe 211 to reduce the pH which has been raised in the course of biological denitrification. By this means, the liquor in stock tank 29 is restored to the strength and volume for the next regeneration of the ion exchanger 22. Surplus biomass is drawn off from reactor 27 at 214.

Figure 3:
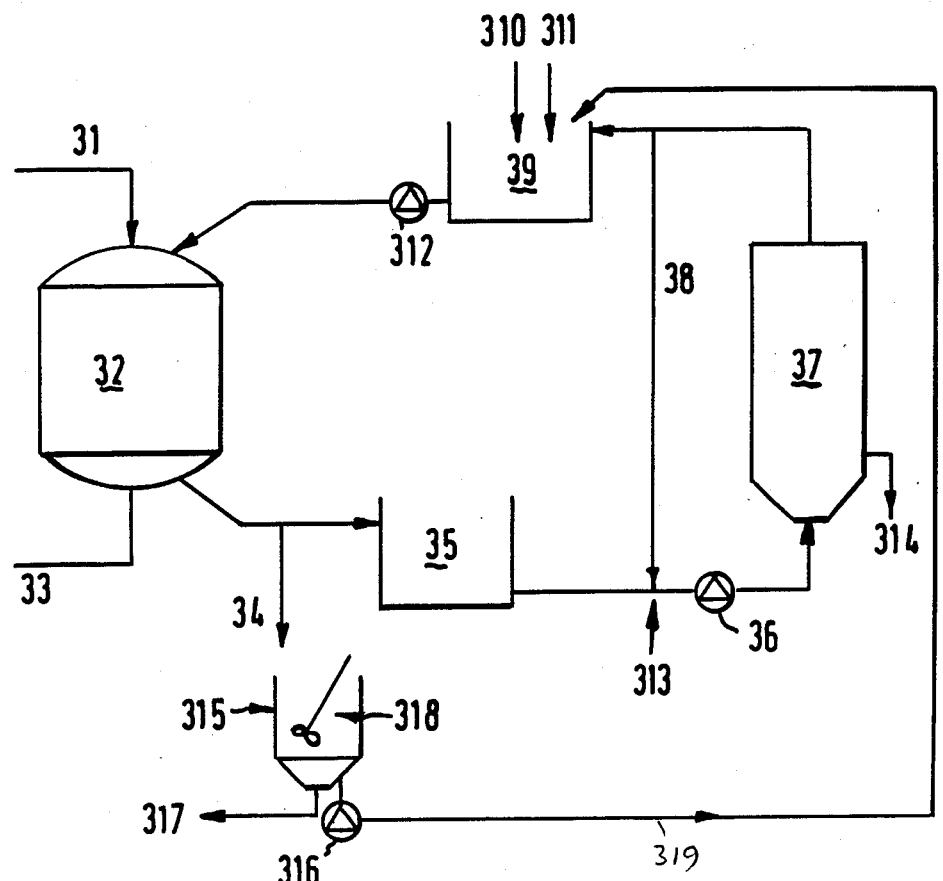

In the example according to FIG. 3, the items numbered 31 to 314 perform functions similar to those numbered 21 to 214 in FIG. 2.

In this case, the sulphate-rich portion of the spent eluate from 34 passes into a mixer-settler 318 which is dosed with an appropriate quantity of calcium chloride through pipe 315. After mixing, the solution is allowed to settle and the clear liquid drawn off by pump 316 through pipe 319 for re-use, together with the rest of the recovered eluate in tank 39. Settled calcium sulphate sludge is drawn off for disposal from the bottom of vessel 318 through pipe 317.

With a similar layout of equipment, it is possible to dose lime slurry through pipe 315, in which case acidification of the recovered liquor at 311 is necessary to neutralise excess alkalinity due to this, as well as that arising in the reactor 37.

Figure 4:
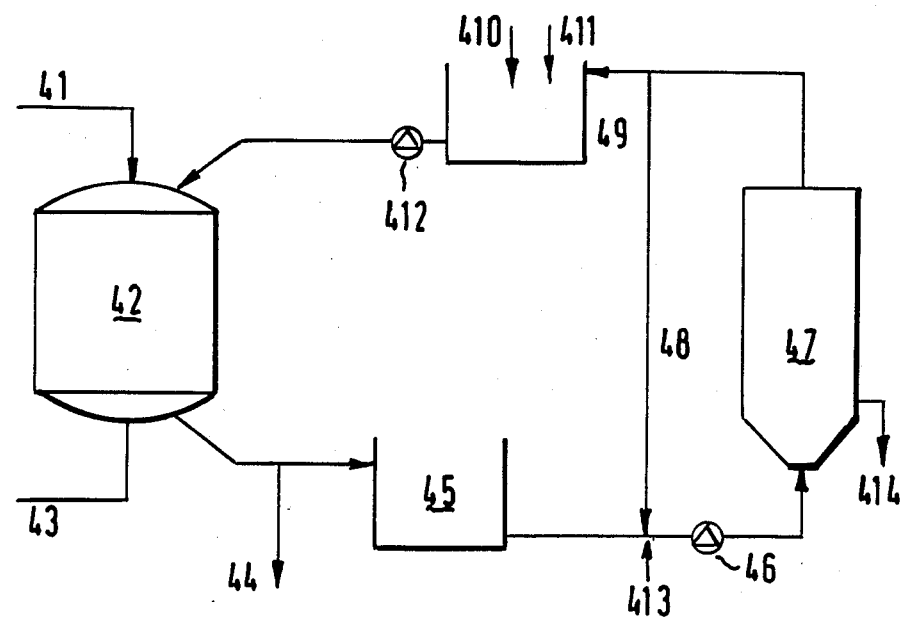

In the example of FIG. 4, the functions of the items are similar to those in FIG. 3 except that the pump 316 and pipe 319 are omitted. The sulphate-rich portion is dosed with a source of calcium ions as in FIG. 3 and the precipitation of calcium sulphate is promoted in vessel 418. The resulting suspension is then run off to drain or to a lagoon or similar device in which the solid matter is allowed to settle for possible land disposals and the supernatant liquor runs off to drain.

Figure 5:
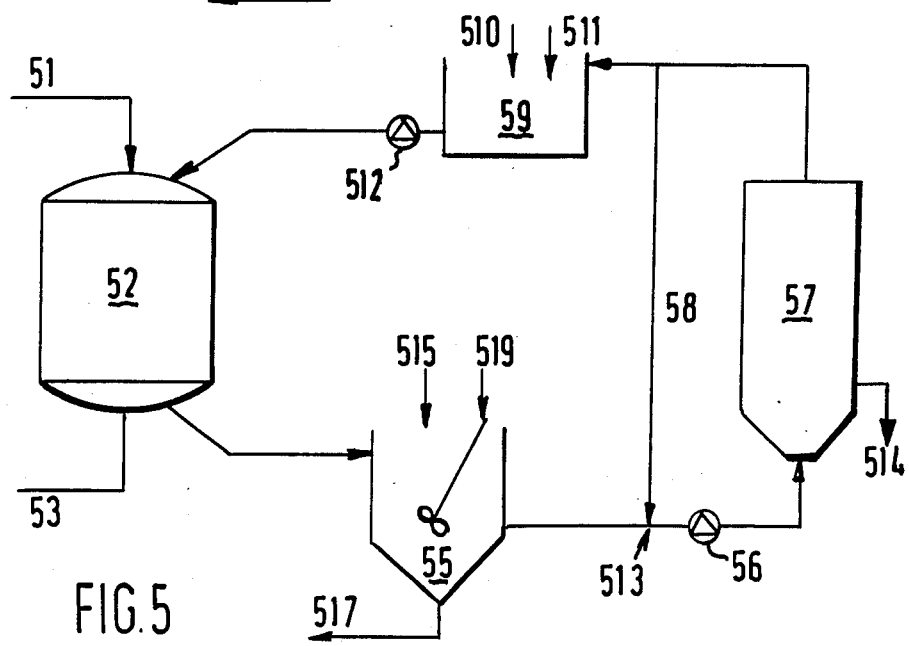

In the example of FIG. 5, the functions of the items are similar to those described in FIG. 2, except for the omissions of the discharge pipe 24. Instead, vessel 55 is designed as a mixer-settler which receives all the spent eluate. A source of calcium 515 is dosed into the solution and the precipitation of calcium sulphate is promoted, possibly with the further addition of a surface agent through pipe 519. The precipitated calcium sulphate is allowed to settle to the bottom of vessel 55 and discharged for disposal through pipe 517 and the clear liquor passes on to the denitrification stage in vessel 57.

Figure 6:
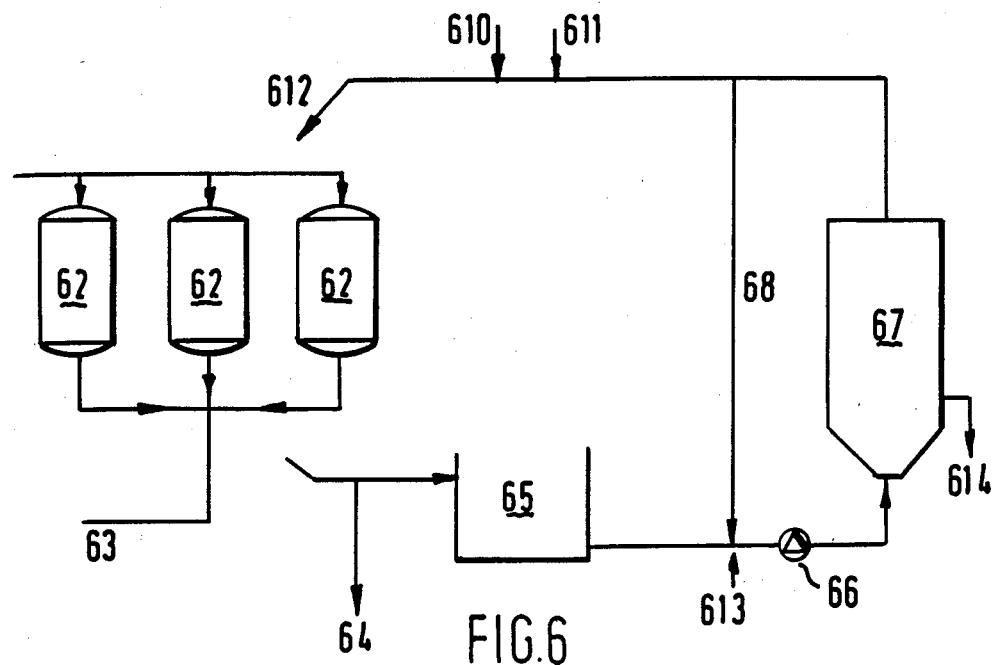

In the example of FIG. 6, the functions of all items are similar to those described in FIG. 2, except that the storage vessel 29 has been omitted and the ion exchange unit 22 has been divided into a number of parallel units, of which three are shown as a typical number in FIG. 6.

In the example of FIG. 6, the units 62 are controlled in such a way that one of them is being regenerated at any one time, while the others are treating water. In this way, the flow of recovered regenerant passes continuously from the reactor 67 to the ion exchangers 62, without the need for intermediate storage. The chemical doses at 610 and 611 may be added at any convenient point, either into line 612 as shown in FIG. 6 or into vessel 67.

The piping and valves in the example of FIG. 6 can also be arranged in such a manner that the water is always treated through two of the units 62 in series so that the unit which receives the raw water first ends up wholly in the sulphate form, while the nitrate is taken up in the second unit. The spent regenerants from these units are then piped respectively through pipe 64 or to vessel 65.

Figure 7:
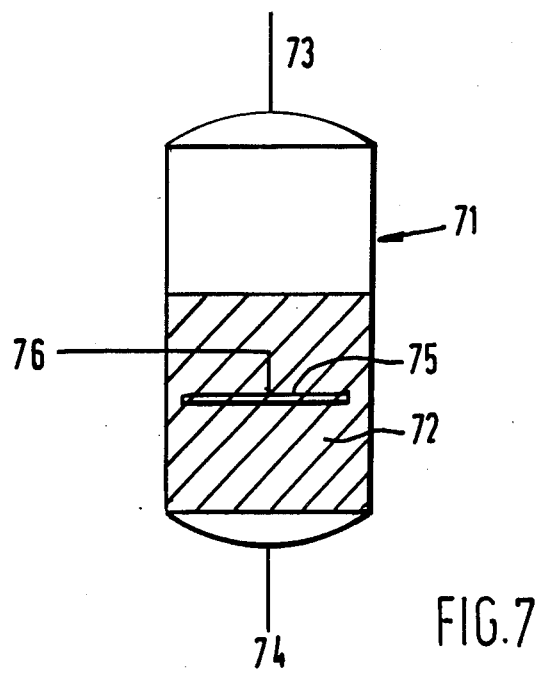

FIG. 7 shows in detail a possible arrangement for an ion exchange unit such as that shown as 22 in FIG. 2, modified for good segregation of the portion of the spent eluate which is expected to be in the sulphate form.

The unit 71 contains an ion exchange bed 72. It is supplied with a top inlet 73 and a bottom outlet 74; both 73 and 74 are equipped with conventional distribution devices which distribute the flow of liquid and prevent the passage of ion exchanger.

In addition to these conventional fittings, the unit is equipped with a distribution device 75 connected to a pipe 76. This device 75, which may be of the conventional header- and -lateral design, is fitted at a level in the bed such that at the end of the ion exchange service run, all the exchanger lying above the device 75 will be substantially in the sulphate form. The level at which the device 75 is fixed will, therefore, depend upon the relative contents of sulphate and nitrate in the water to be treated.

In regeneration, eluent is admitted through pipe 73 and discharged through pipe 76. The spent eluate will be contaminated only with sulphate. When sufficient sulphate has been removed from the exchanger in this way, the flow is diverted from pipe 76 to pipe 74 so thatthe remainder of the bed may now be regenerated. The spent eluate coming through pipe 74 will contain some sulphate and all the nitrate which is removed from the resin.

Alternatively, there are various means by which such a device can be used in counterflow. For example, when the sulphate removal is complete (as above), the eluent is introduced at the bottom through pipe 74 and leaves the unit either through pipe 76 or through pipe 73 and the spent eluate during this period segregated as before.

We claim:

1. A process for reducing the nitrate content in water wherein water containing nitrate is fed through anion exchanging means, including the steps of regenerating the anion exchanging means with an eluate, biologically treating the eluate to reduce the nitrate content thereof, and utilising the eluate of reduced nitrate content in a recycled eluent for regenerating the anion exchanging means.

2. A process according to claim 1 including the step of removing sulphate ions from the eluate.

3. A process according to claim 2 including separating the eluate into portions which are rich in sulphate and nitrate respectively.

4. A process according to claim 3 including utilising chromatographic banding of sulphate and nitrate ions in the anion exchanging means to form said portions.

5. A process according to claim 3 or 4 including dumping the sulphate rich portion to drain.

6. A process according to claim 1 including precipitating sulphate ions from the eluate.

7. A process according to claim 1 wherein the eluent contains bicarbonate ions to regenerate said anion exchanging means.

8. A process according to claim 1 wherein the eluent contains chloride ions to regenerate the anion exchanging means.

9. A process according to claim 1 wherein the biological treatment of the eluate features a metabolic characteristic which increases the concentration of bicarbonate ions in the eluate.

10. A process according to claim 1 wherein the biological treatment of the eluate comprises denitrification thereof with an anoxic bacteriological process.

11. A process according to claim 1 including providing a carbon source and an electron donor source for the bacteria.

12. A process according to claim 11 wherein said sources comprise an organic chemical introduced into the eluate.

13. A process according to claim 11 wherein said carbon source comprises an inorganic source of carbon and said electron source comprises hydrogen introduced into the eluate.

14. A process according to claim 1 including adding a source of chloride to the eluate.

15. A process according to claim 1 including adding to the eluate means for increasing the concentration of bicarbonate ions therein.

16. A process according to claim 1 wherein said biological treatment is performed in a reaction vessel, and including the step of recirculating the eluate through the vessel until a desired level of denitrification is achieved.

17. A process according to claim 1 wherein said anion exchanging means includes a plurality of exchange units operating batchwise and denitrified from a common source, and including the step of denitrifying water from the source with one of said units whilst regenerating another said unit, the number and capacity of said units being so arranged that a substantially constant demand for flow of said recycled eluent is provided, whereby the flow of eluate from said biological process flows continuously for use in the recycled eluent without intermediate storage.

18. A process according to claim 1 wherein said eluate of reduced nitrate content is subjected to a liquid/solids seperating step.

19. A process according to claim 1 wherein the eluate of reduced nitrate content is subjected to disinfection.

* * * * *